US012448165B2

(12) United States Patent
D'Aponte et al.

(10) Patent No.: US 12,448,165 B2
(45) Date of Patent: *Oct. 21, 2025

(54) PACKAGING PLANTS AND METHODS FOR PACKAGING PRODUCTS

(71) Applicant: Fameccanica.Data S.p.A., San Giovanni Teatino (IT)

(72) Inventors: Francesco D'Aponte, San Giovanni Teatino (IT); Diego Gualtieri, San Giovanni Teatino (IT); Matteo Antonioli, San Giovanni Teatino (IT)

(73) Assignee: Fameccanica.Data S.p.A., San Giovanni Teatino (IT)

( * ) Notice: Subject to any disclaimer, the term of this patent is extended or adjusted under 35 U.S.C. 154(b) by 883 days.

This patent is subject to a terminal disclaimer.

(21) Appl. No.: 17/678,348

(22) Filed: Feb. 23, 2022

(65) Prior Publication Data

US 2022/0281629 A1 Sep. 8, 2022

(30) Foreign Application Priority Data

Mar. 3, 2021 (EP) .................................... 21160412

(51) Int. Cl.
*B65B 65/00* (2006.01)
*B65B 5/06* (2006.01)
*B65B 35/44* (2006.01)
*B65G 1/137* (2006.01)

(52) U.S. Cl.
CPC .............. *B65B 65/003* (2013.01); *B65B 5/06* (2013.01); *B65B 35/44* (2013.01); *B65G 1/137* (2013.01)

(58) Field of Classification Search
CPC ......... B65B 65/003; B65B 5/06; B65B 35/44; B65B 35/30; B65B 5/08; B65B 35/16; B65G 1/137; B65G 37/02; B65G 54/02; B65G 1/1378; B65G 1/04; B65G 1/1373
See application file for complete search history.

(56) References Cited

U.S. PATENT DOCUMENTS

| 6,535,777 | B1 | 3/2003 | Kohler |
| 11,912,454 | B2* | 2/2024 | D'Aponte ............... B65B 35/30 |
| 2018/0074478 | A1 | 3/2018 | Burkhard et al. |
| 2018/0178992 | A1* | 6/2018 | Gondoh ............... B65G 1/0485 |
| 2020/0319648 | A1 | 10/2020 | Eckman |
| 2021/0047122 | A1 | 2/2021 | Issing et al. |

OTHER PUBLICATIONS

Boysen Nils et al., "Warehousing in the e-commerce era: A survey", European Journal of Operational Research, Elsevier, Amsterdam, NL. p. 396-411, vol. 277, No. 2. Aug. 23, 2018.
European Search Report dated Aug. 9, 2021. 5 pages.

* cited by examiner

*Primary Examiner* — Timothy R Waggoner
(74) *Attorney, Agent, or Firm* — RMCK Law Group PLC

(57) ABSTRACT

A packaging plant and packaging method for packaging consumer products simultaneously in a large distribution packaging format and in customised e-commerce formats. The packaging plant and the packaging method significantly improve the sustainability of e-commerce packaging of consumer products in that an e-commerce packaging area is supplied with products coming directly from a manufacturing machine without being previously packaged into large distribution packages.

15 Claims, 4 Drawing Sheets

PACKAGING PLANTS AND METHODS FOR PACKAGING PRODUCTS

CROSS-REFERENCE TO RELATED APPLICATION

This application claims priority to European Patent Application No. 21160412.9 filed Mar. 3, 2021. The disclosure of the above application is incorporated herein by reference in its entirety.

FIELD OF THE INVENTION

The present invention relates in general to the field of packaging, in particular to the field of packaging of consumer products.

More specifically, the invention relates to packaging plants for packaging consumer products in different packaging formats.

The present invention has been developed with the aim of packaging consumer products either in a standard packaging format intended for large distribution channels and in customized packaging formats intended for e-commerce.

In the following, reference will be made to this specific field without however losing generality.

Embodiments of the present invention relate to methods for flexible packaging of products.

DESCRIPTION OF THE RELATED ART

Consumer products are typically manufactured by manufacturing machines having a very high production rate, typically of several hundred pieces per minute.

Each manufacturing machine typically produces a flow of a single type of products. The manufacturing machines may periodically change the type of product which is manufactured (for instance the size of the product). When the manufacturing machine can be configured for changing the type of products, typically the manufacturing machine produces batches of products, wherein each batch is made of products of a single type.

The flow of products at the output of the manufacturing machines is sent to a packaging unit. Typically, the packaging unit is configured for packaging the products in a format suitable for the large distribution. Typically, the large distribution packaging format consists of relatively large packages (for instance flexible bags or cardboard boxes) containing all the same number of one single type of product. The products forming the large distribution packaging are typically packaged in a package which may comprise a primary package and a secondary package.

With the ever-growing diffusion of e-commerce, many consumer product manufacturers have started distributing consumer products both through large distribution channels and through e-commerce channels.

While the large distribution requires standard packages containing a fixed relatively large number of a single type of product, e-commerce distribution systems require small number of products to be packaged in highly customized packages corresponding to the order of the final customer. Typically, an e-commerce order includes different types of products, with a variable number of products for each type of product.

The automated packaging units used for packaging consumer products directed to the large distribution do not have the flexibility required for the e-commerce distribution.

In the state of the art, consumer products at the output of manufacturing machines are all packaged in large distribution packaging formats. E-commerce orders are prepared by: i) opening the large distribution packages, ii) extracting from the large distribution packages the required type and number of products, and iii) packaging the composition of products corresponding to a specific order in e-commerce packaging containers. These operations are typically carried out manually.

The traditional packaging for e-commerce distribution of consumer products involves a large use of manpower and a great waste of packaging material. In fact, the packages in which the consumer products have previously been packaged for shipping to the large distribution are wasted, which has a negative impact on sustainability of the packaging process.

There is therefore a need for packaging systems and methods which allow both high-volume packaging of consumer products in the format required by the large distribution and high flexibility packaging for e-commerce distribution.

One of the main problems for carrying out flexible packaging of different products is that often the different products are manufactured by production machines which may have quite different production rates. The different production rates of different manufacturing machines make it difficult to coordinate the production rates of different manufacturing machines with the packaging rates of the packaging machines. When the need arises to package groups of consumer products with variable number of products and different types of products supplied by different manufacturing machines, these activities are typically carried out offline, i.e. in a station which is not in-line with respect to the production machines and to the packaging machines. Typically, packaging operations in these cases are carried out by operators who manually group the consumer products in relation to the specific customised packages corresponding to the orders of the final customer.

The solutions which involve the use of operators for manual packaging are slow and subject to multiple non-monitorable errors. Human errors in the composition of manual packaging are problematic in that it is difficult to implement actions which prevent such errors from happening again.

Other known solutions require frequent modifications of the packaging plant in order to process and package different combinations of groups of consumer products. This significantly increases cost and production times.

The prior art solutions have additional problems with the packaging of groups of consumer products with a considerable difference in the number of products in different packages, for instance ten consumer products in a first package and three consumer products in a second package. The known solutions have the additional limitation that they do not allow the production of consumer products at the maximum rate allowed by the manufacturing machines.

OBJECT AND SUMMARY OF THE INVENTION

The object of the present invention is to provide packaging plants and packaging methods for the flexible packaging of consumer products which overcome the drawbacks and limitations of the prior art.

Another object of the present invention is to provide a packaging plant and method which have an improved sustainability with respect to the prior art solutions, specifically with respect to the elimination of the waste of packaging material due to the re-packaging operations of the prior art.

Another object of the invention is to provide packaging plants and methods for the flexible packaging of groups of consumer products that does not require modifications to the packaging plant or the use of operators for packaging groups of consumer products comprising different number and/or different types of consumer products.

An additional object of the invention is to provide packaging plants and methods for producing packages containing a variable number of consumer products, even with highly different number of consumer products in different packages and which can vary the number and types of consumer products to be packaged without the need of stopping or slowing-down the production rate.

In accordance with the present invention, these objects are achieved by a packaging plant having the features of claims 1 and 8 and by a packaging method having the features of claim 9.

Optional features of the invention form the subject of the dependent claims.

The claims are an integral part of the disclosure submitted in relation to the invention.

BRIEF DESCRIPTION OF THE DRAWINGS

Further characteristics and advantages of the invention will become clear from the following description, given purely as a non-limiting example, with reference to the attached drawings, wherein.

DETAILED DESCRIPTION

Figure 1:
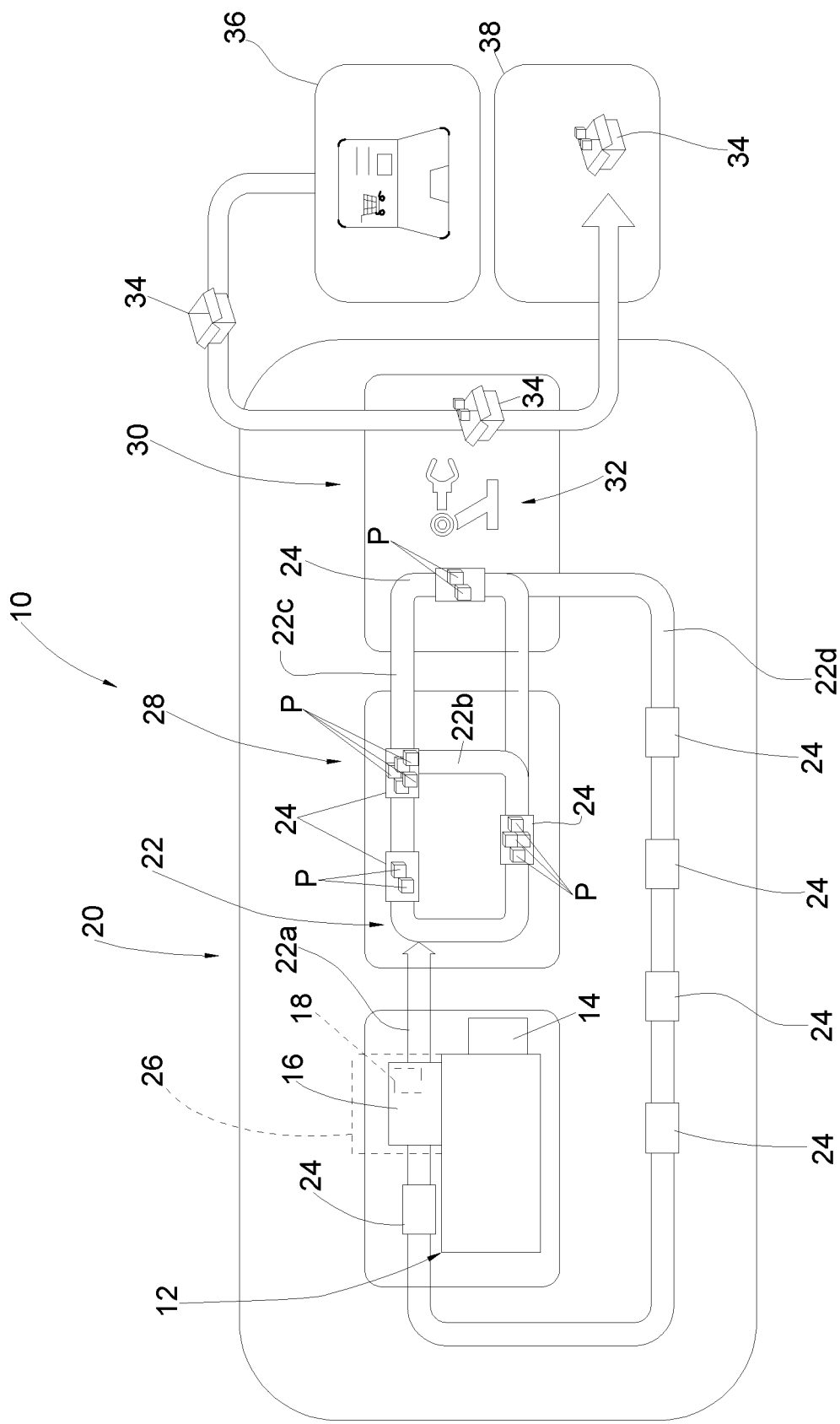
FIG. 1 is a schematic view of a packaging plant according to a possible embodiment of the present invention.

With reference to FIG. 1, a packaging plant for packaging consumer products is indicated by 10.

The packaging plant 10 comprises at least one manufacturing machine 12 configured for manufacturing at least one flow of consumer products. The manufacturing machine 12 may be configured for manufacturing a single type of products or subsequent batches of different types of products.

The packaging plant 10 comprises at least one large distribution packaging unit 14 set at the output of the manufacturing machine 12. The large distribution packaging unit 14 receives the main flow of products exiting the manufacturing machine 12.

The definition "large distribution packaging unit" defines a packaging unit which is configured for packaging products in the format required by the large distribution. Typically, consumer products directed to the large distribution are packaged in standard formats which include a fixed number of products in each package. Typically, the large distribution packaging format includes many products of a single type.

The large distribution packaging unit 14 is configured for receiving products from the manufacturing machine 12 and for packaging said products in a packaging bag or container, with a fixed number of products of a single type in each package. Typically, the large distribution packaging unit 14 does not have the capability of varying the number of products in each package or of packaging different product types in each package.

The packaging plant 10 comprises a draw-off unit 16 configured for drawing-off products intended to be distributed through e-commerce distribution channels from the main flow of products at the output of the manufacturing machine 12. The products intended to be distributed through e-commerce distribution channels are delivered to a filling station 26 located downstream of the draw-off unit 16.

The packaging plant 10 comprises a conveyor system 20 controlled by an electronic control unit. The conveyor system 20 comprises a stationary guide system 22 including a plurality of guide sections 22a, 22b, 22c, 22d. The packaging plant 10 comprises a plurality of transfer containers 24 which are movable independently of each other along the guide sections 22a, 22b, 22c, 22d. The stationary guide system 22 may be the stator of a linear motor system and the transfer containers 24 may be connected to movers of the linear motor system which are magnetically coupled to the stationary guide system 22. Alternatively, the stationary guide system 22 may be a mechanical conveyor provided with motor-driven chains of belts for transporting the transfer containers 24 along the guide sections 22a, 22b, 22c, 22d.

The stationary guide system 22 may comprise a guide section 22a extending through the filling station 26. At the filling station 26 empty transfer containers 24 are filled with products or group of products coming from the draw-off unit 16.

In a possible embodiment, the individual products or group of products intended to be distributed through e-commerce distribution channels may be packaged in primary packages. This is important especially when the products should be protected against contamination, for instance if the products are sanitary products (e.g. absorbent sanitary products) or the like.

In a possible embodiment the packaging plant 10 may comprise a primary packaging unit 18 configured for receiving individual products or group of products from the draw-off unit 16, packaging individual products or group of products into primary packages, and delivering the packaged individual products or group of products into the transfer containers 24 at the filling station 26.

Each transfer container 24 may contain the same type of products. The number of products or of groups of products contained in the transfer containers 24 may be fixed or variable.

The packaging plant 10 comprises a stocking area 28 configured for receiving a plurality of transfer containers 24 containing respective products. In a possible embodiment, the stationary guide system 22 may comprise a closed-loop guide section 22b positioned in the stoking area 28, along which are positioned a plurality of transfer containers 24 containing respective products P.

The packaging plant 10 comprises a flexible packaging area 30 including at least one packaging robot 32. The stationary guide system 22 may comprise a guide section 22c which connects to each other the stocking area 28 and the flexible packaging area 30. The conveyor system 20 is configured for taking transfer containers 24 from the stoking area 28 and for transferring the transfer containers 24 to the flexible packaging area 30 along the guide section 22c.

The packaging robot 32 is configured for picking products or groups of products from the transfer container 24 placed in the flexible packaging area 30 and for placing a variable number of products in packaging containers 34.

The packaging robot 32 may operate under the control of an e-commerce server 36 which receives orders from an e-commerce network. Each order may include different types of products and a variable number of products for each type of product. For instance, an e-commerce order may be structured as shown in the following table:

| Type of Product | No. of Products |
|---|---|
| A | X |
| B | Y |
| C | Z |
| ... | ... |

The number of different types of products A, B, C, ... depend on the number of different products which may be manufactured by the manufacturing machine 12. The number of products X, Y, Z of each type of products may vary depending on the specific order.

The e-commerce server 36 sends packaging orders to the packaging robot 32. The packaging robot 32 picks in the transfer container 24 placed in the flexible packaging area 30 the desired type of product A, B, C, ... in the respective quantities X, Y, Z, ... and places the products in the packaging container 34.

The packaging robot 32 may pick from the container 24 groups of products, wherein each group of products is formed by a number of products selected in a fixed range of numbers. The groups of products may be combined to reach the number of products required by the specific e-commerce order.

For instance, each group of products may be formed by a number of products selected among 1, 2, 3, 5, 10 products. If, for instance, the e-commerce order is for 14 products, the packaging robot 32 may pick three groups of products formed, respectively, by 10, 2, 2 products, or 10, 3, 1 products, or other combinations based on the predetermined number of products. The choice of the combination of the groups of products may be made on the basis of the availability of the groups of products in the containers 24. This procedure optimizes the operation of the packaging robot 32 by reducing the number of movements of the packaging robot 32 which are necessary for composing the specific e-commerce orders.

When the order is complete, the packaging container 34 is sent to a shipping area 38. The packaging containers 34 formed in the flexible packaging area 30 are completely different from the packages formed by the large distribution packaging unit 14 in that each packaging container 34 may contain different types of products in a variable number and may be different from any other packaging container, whereas the packages formed by the large distribution packaging unit 14 typically are all composed of one single type of product in a fixed quantity.

In a possible embodiment, individual products or group of products may be packaged into respective primary packages in the flexible packaging area 30. The packaging robot 32 may be configured for sealing individual products or groups of products in flexible bags, before placing the products in the packaging containers 34.

When a transfer container 24 placed in the packaging area 24 is empty or contains a number of products below a predetermined threshold, it is transported along a return guide section 22d of the stationary guide system 22, which returns the empty or partially empty transfer containers 24 to the filling station 26. The return section 22d of the stationary guide system 22 may form a buffer for empty or partially empty transfer containers 24 waiting to be transported to the filling station 26.

In a possible embodiment (not shown), the conveyor system 20 may comprise a planar surface forming the stationary guide system 22. A plurality of transport units may carry respective transfer containers 24. The transport units may be magnetically coupled to the planar surface. The transport units may be movable on the planar surface in any direction and may also rotate about respective axes orthogonal to the planar surface. The transport units might weigh the containers they carry, so that a count of the number of products contained in the transfer containers 24 can be based on the weight acting on each transport unit. Each transport unit may be assigned to a specific product package and the transport units may populate a storing area while waiting to serve the packaging robot 32 on the basis of orders coming from the e-commerce sever 36.

Figure 2:
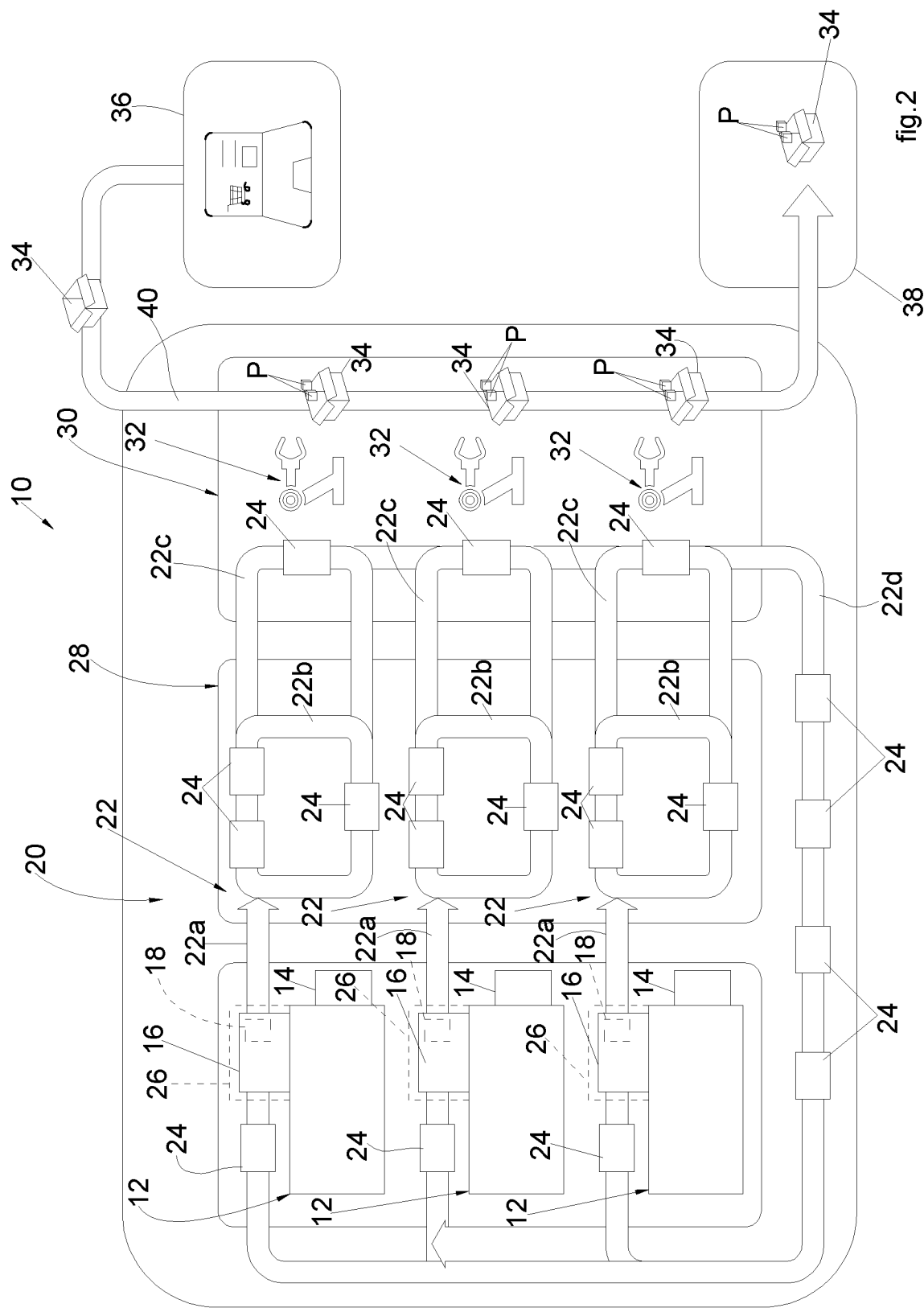
FIG. 2 is a schematic view of a packaging plant according to the embodiment of FIG. 1 and configured for operating with several different manufacturing machines.

FIG. 2 schematically shows a packaging plant having the same basic structure as the embodiment of FIG. 1 but comprising a plurality of manufacturing machines 12. The manufacturing machines 12 may produce different types of products. Each of the manufacturing machine 12 may be associated to a respective large distribution packaging unit 14 and to a respective draw-off unit 16. Each of the draw-off units 16 may be provided with a respective primary packaging unit 18.

In the packaging plant 10 of FIG. 2 the conveyor system 20 may comprise a plurality of stationary guide systems 22 associated to respective manufacturing machines 12. Each stationary guide system 22 may comprise respective guide sections 22a, 22b, 22c, as previously disclosed. The stationary guide systems 22 may share a common return guide section 22d.

The flexible packaging area 30 may comprise a plurality of packaging robots 32, each of which is configured for picking products from a respective transfer container 24 placed in the flexible packaging area 30 and for placing such products in a packaging container 34. The packaging containers 34 may move on a package guide 40 which moves the packaging containers 34 from one packaging robot 32 to the next. The packaging robots 32 are controlled on the basis of the e-commerce orders received by the e-commerce server 36, in order to compose in each packaging container 34 a specific order consisting of products of different types and in different quantities.

When a transfer container 24 is empty, it is removed from the flexible packaging area 30 via the return guide section 22d.

The products of a certain type may be drawn-off from the respective manufacturing machines 12 and placed into the transfer containers 24 only when the total number of products of that type present in the stocking area 28 is below a predetermined threshold. This allows optimization of the operation. If there are no orders for a certain type of product, there is no need to draw-off that type of products from the manufacturing machines. On the contrary, when there are orders which finish the stock of a certain type of product, that type of product is drawn-off in the quantity necessary to comply with the orders and to restore the stock.

The stocking area 28 forms a buffer between the manufacturing machines 12 and the flexible packaging area 30, which allows the flexible packaging area 30 to operate at maximum capacity even in case of momentary interruptions of the manufacturing machines 12.

Figure 3:
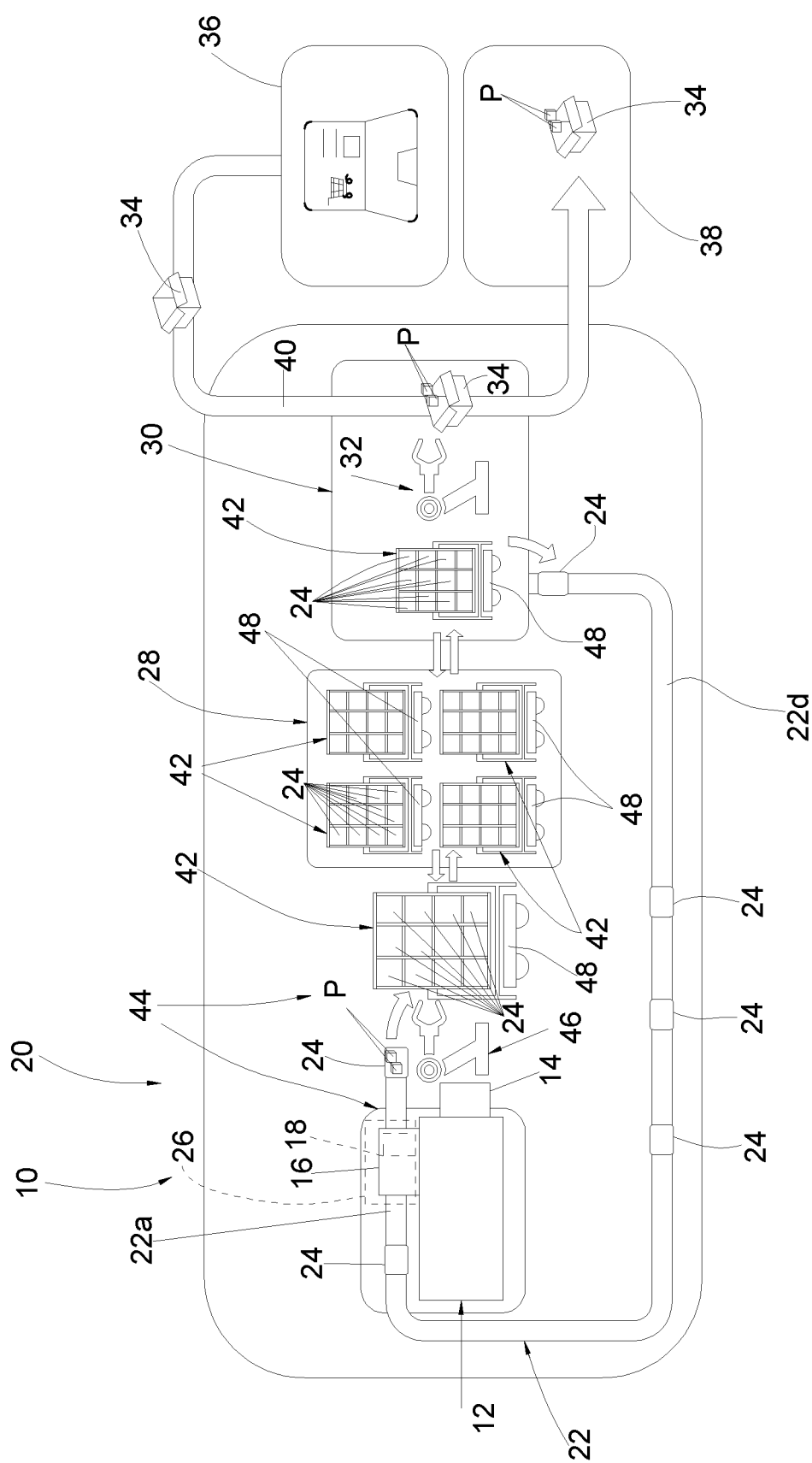
FIG. 3 is a schematic view of a packaging plant according to another embodiment of the present invention.

FIG. 3 shows a second embodiment of a packaging plant according to the invention. The elements corresponding to those previously disclosed are indicated by the same reference numerals.

As in the embodiment of FIGS. 1 and 2, the packaging plant 10 comprises a manufacturing machine 12 associated to a large distribution packaging unit 14 and to a draw-off unit 16. The draw-off unit 16 may be associated to a primary packaging unit 18 configured for packaging individual products or group of products into primary packages (e.g. flexible bags).

As in the embodiment of FIGS. 1 and 2, the packaging plant 10 comprises a conveyor system 20 including a stationary guide system 22 including a plurality of guide sections 22a, 22d and a plurality of transfer containers 24 which are movable independently of each other along the guide sections 22a, 22d. The conveyor system 20 is configured for positioning empty transfer containers 24 at a filling station 26 where the transfer containers 24 are filled with products or group of products exiting the draw-off unit 16 or the primary packaging unit 18.

The packaging plant 10 of the embodiment of FIG. 3 comprises a plurality of movable stocking units 42. Each stocking unit 42 may have the shape of a cabinet having a plurality of horizontal shelves. The shelves of the stocking units 42 are configured for receiving the transfer containers 24.

The packaging plant 10 comprises a clustering area 44 including at least one clustering robot 46. The clustering robot 46 is configured for picking the transfer containers 24 containing respective products or groups of products P at the end of the guide section 22a and for placing the transfer containers 24 into selected shelves of a stocking unit 42 placed in the clustering area 44. In a possible embodiment, the stoking units 42 may be configured to isolate the transfer containers 24 contained therein from the outside environment. For instance, each stoking unit 42 may have at least one door movable from an open position to a closed position. In the open position the inner room of the stoking unit 42 is accessible for placing the transfer containers 24 on the shelves and for removing the transfer containers 24 from the shelves. In the closed position the inner room of the stoking unit 42 is isolated from the outside environment to prevent contamination of the products P.

The packaging plant 10 of FIG. 3 comprises a stocking area 28 containing a plurality of stoking unit 42 which in turn contain respective transfer containers 24.

The packaging plant 10 of FIG. 3 further comprises a flexible packaging area 30 comprising at least one packaging robot 32.

In possible embodiments, the packaging plant 10 of FIG. 3 may comprise a plurality of automated guided vehicles 48 configured for releasably engaging the stocking units 42. The automated guided vehicles 48 may transport the stocking units 42 between the clustering area 44, the stocking area 28, and the flexible packaging area 30. Once the stocking units 42 have been positioned in the clustering area 36, stocking area 28 or flexible packaging area 30, the automated guided vehicle 48 may disengage from the stocking unit 42 and may be used for moving another stocking unit 42. The number of the automated guided vehicles 48 may be substantially less than the number of the stocking units 42 since only a small part of the total number of stocking unit 42 must be moved at the same time.

In the flexible packaging area 30 the at least one packaging robot 32 is configured for picking products from the transfer containers 24 contained in the stocking unit placed in the flexible packaging area 30 and for placing such products in packaging containers 34 advancing along a package guide 40. When a transfer container 24 is empty, the at least one packaging robot 32 removes the empty transfer container 24 from the stocking unit 42 and places it on the return guide section 22d, which brings the empty transfer containers 24 to the filling station 26.

In a possible embodiment, the movable stocking units 42 may receive individual products or groups of products not contained in the transfer containers 24. In this embodiment, in the clustering area 44 the at least one clustering robot 46 is configured for picking products or groups of products P from the transfer containers 24 at the end of the guide section 22a, and for placing said products P on selected shelves of a movable stocking unit 42 placed in the clustering area 44. The products or groups of products P may be loose or enclosed in primary packages. The movable stocking units 42 containing the products are stocked in the stocking area 28. In this embodiment, in the flexible packaging area 30 the at least one packaging robot 32 is configured for picking products from a movable stocking unit 42 placed in the flexible packaging area 30 and for placing a variable number of products into the packaging containers 34. In this embodiment the transfer containers 24 are emptied in the clustering area 44. The empty transfer containers 24 are transported from the clustering area 44 to the filling station 26.

Figure 4:
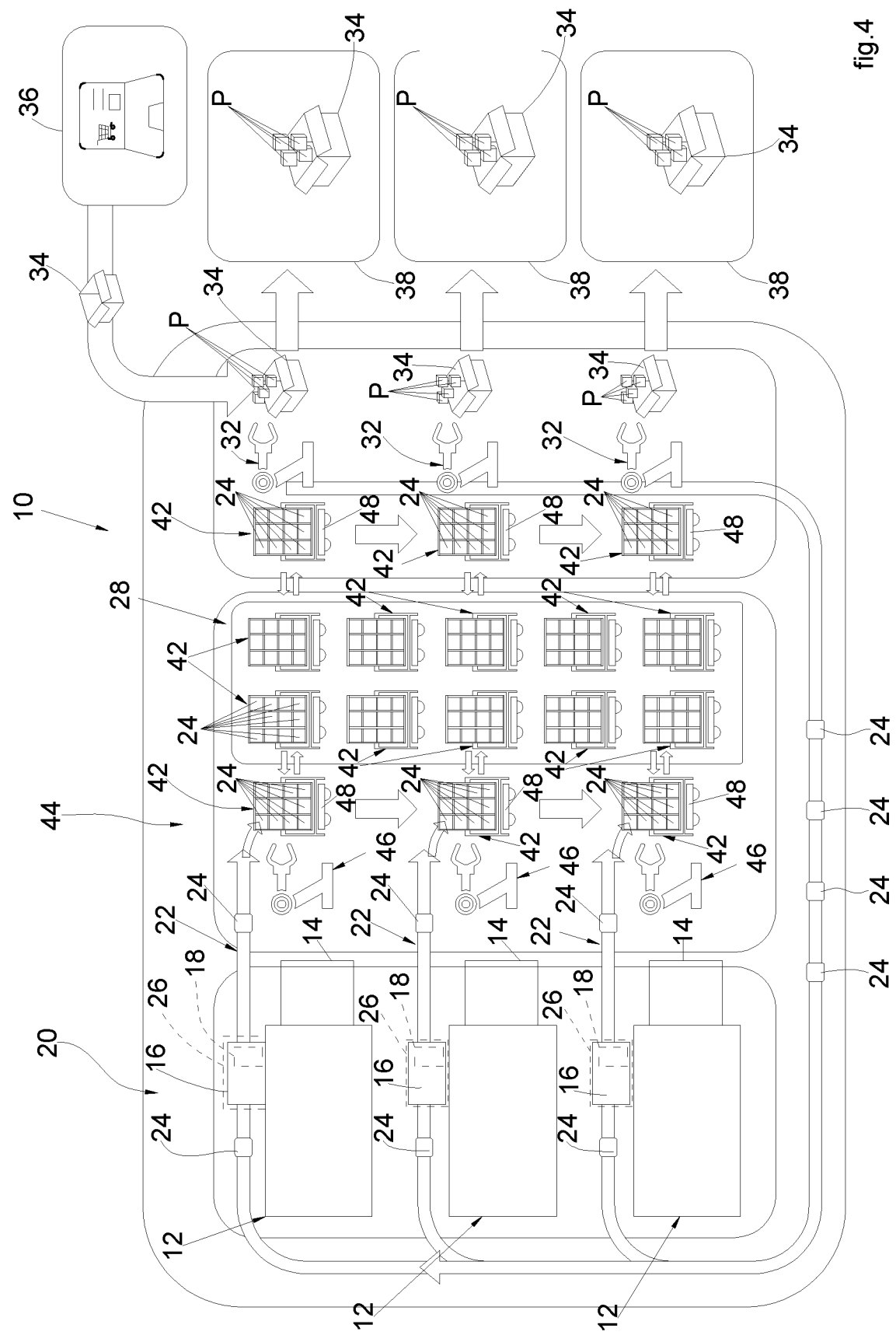
FIG. 4 is a schematic view of a packaging plant according to the embodiment of FIG. 3 and configured for operating with several different manufacturing machines.

FIG. 4 schematically shows a packaging plant having the same basic structure as the embodiment of FIG. 3 but comprising a plurality of manufacturing machines 12. The manufacturing machines 12 may produce different types of products. Each of the manufacturing machines 12 may be associated to a respective large distribution packaging unit 14 and to a respective draw-off unit 16. Each of the draw-off units 16 may be provided with a respective primary packaging unit 18.

In the embodiment of FIG. 4 the clustering area 44 may comprise a plurality of clustering robots 46 configured for picking the transfer containers 24 containing respective products or groups of products P at the end of the respective guide sections 22a and for placing the transfer containers 24 into selected shelves of respective stocking units 42 placed in the clustering station 44.

In the embodiment of FIG. 4, the stoking units 42 may move in the clustering area 44 from one clustering robot 46 to another, so that each stoking unit 42 may contain transfer containers 24 containing products of different types.

In the embodiment of FIG. 4, the flexible packaging area 30 may comprise a plurality of packaging robots 32, each of which is configured for picking products P from the transfer containers 24 contained in a respective stocking unit 42 placed in the flexible packaging area 30 and for placing such products in packaging containers 34. Since each stocking unit 42 contains products of different types, each packaging robot 32 may compose in a packaging container 34 an order comprising different products. When the packaging orders are complete, the packaging containers 34 are sent to respective delivery stations 38. Therefore, in the embodiment of FIG. 4 the packaging containers 34 are filled in parallel by respective packaging robots 32, whereas in the embodiment of FIG. 2 the packaging containers 34 are filled by the packaging robots 32 in series.

When the transfer container 24 are empty, the packaging robots place them on the return guide section 22d, which brings the empty transfer containers 24 to the filling station 26. When the stocking units 42 placed in the flexible packaging station 30 are empty of a certain type of product they are returned to the clustering area 44 for refill.

The packaging plant 10 according to the present invention is capable of forming simultaneously standard packages intended to be distributed through large distribution channels and highly customised packages corresponding to individual orders placed through an e-commerce network.

A significant aspect of the present invention is that the products intended for the e-commerce packaging come directly from the manufacturing machines without being previously packaged into large distribution packages. This is a significant sustainability improvement as compared to prior art solutions wherein the products for e-commerce distribution are first packaged into large distribution packages and then the large distribution packages are opened for composing the e-commerce orders.

The solution according to the present invention provides a substantial contribution to sustainability of e-commerce packaging in that it eliminates waste of large distribution packaging material.

Also, the solution according to the present invention reduces significantly the use of manpower for the e-commerce packaging.

The specific embodiments disclosed herein may be varied or modified without departing from the scope of the invention as defined by the following claims.

The invention claimed is:

1. A packaging plant, comprising:
    at least one manufacturing machine configured for manufacturing at least one flow of products,
    at least one large distribution packaging unit configured for receiving said at least one flow of products from said at least one manufacturing machine and for packaging first products of said at least one flow of products in a large distribution packaging format,
    at least one draw-off unit associated to said at least one manufacturing machine and configured for drawing-off second products from said at least one flow of products, the second products intended to be distributed through e-commerce distribution channels,
    a filling station located downstream of said at least one draw-off unit,
    a plurality of transfer containers movable independently of each other along at least one stationary guide system and configured for receiving said second products at said filling station,
    a stocking area wherein at least one of said plurality of transfer containers are stocked, and
    a flexible packaging area including at least one packaging robot configured for picking second products from transfer containers of the plurality of transfer containers that are placed in said flexible packaging area and for placing a variable number of the second products that are picked into packaging containers.

2. The packaging plant of claim 1, further comprising at least one primary packaging unit configured for:
    receiving individual second products or group of second products from said at least one draw-off unit,
    packaging the individual second products or group of second products into primary packages, and
    delivering the primary packages to said filling station.

3. The packaging plant of claim 1, wherein said least one packaging robot is configured for sealing individual second products or groups of the second products into primary packages before placing said individual second products or groups of second products into said packaging containers.

4. The packaging plant of claim 1, wherein said at least one stationary guide system comprises a closed-loop guide section positioned in said stocking area, along which are positioned the transfer containers containing second products, and a guide section which connects to each other the stocking area and the flexible packaging area.

5. The packaging plant of claim 1, further comprising:
    a plurality of movable stocking units each comprising a plurality of shelves configured for receiving said transfer containers, and
    a clustering area including at least one clustering robot configured for picking said transfer containers on said at least one stationary guide system, and for placing said transfer containers that are picked on selected shelves of at least one movable stocking unit of the plurality of movable stocking units placed in said clustering area.

6. The packaging plant of claim 5, comprising a plurality of automated guided vehicles, each of which is configured for releasably engaging a movable stocking unit of the plurality of movable stocking units and for moving said movable stocking unit between said clustering area, said stocking area and said flexible packaging area.

7. The packaging plant of claim 1, wherein the at least one manufacturing machine comprises at least two manufacturing machines configured for manufacturing respective flows of products that are different from one another and associated to respective large distribution packaging units of the at least one large distribution packaging unit and to respective draw-off units of the at least one draw-off unit.

8. A packaging plant comprising:
    at least one manufacturing machine configured for manufacturing at least one flow of products,
    at least one large distribution packaging unit configured for receiving first products of said at least one flow of products from said at least one manufacturing machine and for packaging said first products in a large distribution packaging format,
    at least one draw-off unit associated to said at least one manufacturing machine and configured for drawing-off second products from said at least one flow of products, the second products intended to be distributed through e-commerce distribution channels,
    a filling station located downstream of said at least one draw-off unit,
    a plurality of transfer containers movable independently of each other along at least one stationary guide system and configured for receiving said second products intended to be distributed through e-commerce distribution channels at said filling station,
    a plurality of movable stocking units each comprising a plurality of shelves configured for receiving said second products,
    a clustering area including at least one clustering robot configured for picking second products from transfer containers of the plurality of transfer containers on said at least one stationary guide system, and for placing said second products that are picked from the transfer containers on selected shelves of at least one movable stocking unit of the plurality of moveable stocking units placed in said clustering area,
    a stocking area wherein at least one of said plurality of movable stocking units are stocked, and
    a flexible packaging area including at least one packaging robot configured for picking second products from the at least one movable stocking unit placed in said flexible packaging area and for placing a variable number of second products that are picked form the at least one movable stocking unit into packaging containers.

9. A method for packaging products, comprising:

producing at least one flow of products, packaging first products of said at least one flow of products in a large distribution packaging format, drawing-off second products from said at least one flow of products, the second products intended to be distributed through e-commerce distribution channels, placing the drawn-off second products into transfer containers movable independently of each other along at least one stationary guide system, stocking said transfer containers containing said second products in a stocking area, moving said transfer containers from said stocking area to a flexible packaging area, picking second products from said transfer containers placed in said flexible packaging area by at least one packaging robot and placing a variable number of the second products picked from said transfer containers in packaging containers.

10. The method of claim 9, comprising sealing individual second products or groups of the second products into respective primary packages before placing said individual second products or groups of second products into said transfer containers.

11. The method of claim 9, wherein producing at least one flow of products comprises producing at least two flows of different products.

12. The method of claim 9, wherein said second products are drawn-off from said at least one flow of products when a total number of second products contained in said transfer containers stocked in said stocking area is below a predetermined threshold.

13. The method of claim 9, comprising stocking said transfer containers containing said second products along a closed-loop guide section of said at least one stationary guide system positioned in said stocking area.

14. The method of claim 9, comprising:

picking one or more transfer containers of said transfer containers on said at least one stationary guide system, placing said picked one or more transfer containers on selected shelves of at least one movable stocking unit placed in a clustering area, and stocking said at least one movable stocking unit in said stocking area.

15. A computer program configured for implementing the method according to claim 9.

* * * * *